United States Patent [19]
Gamlen

[11] Patent Number: 5,154,594
[45] Date of Patent: Oct. 13, 1992

[54] ANIMAL LITTER AND METHOD FOR MAKING AN ANIMAL LITTER

[76] Inventor: Meredith L. Gamlen, 505 Baywood, Seabrook, Tex. 77586

[21] Appl. No.: 580,314

[22] Filed: Sep. 10, 1990

[51] Int. Cl.$^5$ ............................................. A01K 1/015
[52] U.S. Cl. ..................................... 119/171; 119/173
[58] Field of Search ................................ 119/171–173

[56] References Cited

U.S. PATENT DOCUMENTS

| | | | |
|---|---|---|---|
| 3,636,927 | 1/1972 | Baum | 119/171 |
| 3,892,846 | 7/1975 | Wortham | 119/173 |
| 3,941,090 | 3/1976 | Fry | 119/171 |
| 4,465,019 | 8/1984 | Johnson | 119/1 |
| 4,607,594 | 8/1986 | Thacker | 119/173 |
| 4,704,989 | 11/1987 | Rosenfeld | 119/1 |
| 4,844,010 | 7/1989 | Ducharme | 119/1 |

FOREIGN PATENT DOCUMENTS

| | | | |
|---|---|---|---|
| 39522 | 11/1981 | European Pat. Off. | 119/171 |
| 76447 | 3/1983 | European Pat. Off. | 119/171 |
| 1091889 | 5/1984 | U.S.S.R. | 119/171 |

OTHER PUBLICATIONS

Material Safety Data Sheet, "Bio-Enzymes" Mar. 20, 1989.

*Primary Examiner*—John G. Weiss
*Attorney, Agent, or Firm*—Ben D. Tobor

[57] ABSTRACT

An animal litter and method for making an animal litter, includes combining bacteria with an absorptive material whereby the bacteria decomposes the animal waste which comes in contact with the absorptive material.

19 Claims, No Drawings

ANIMAL LITTER AND METHOD FOR MAKING AN ANIMAL LITTER

FIELD OF THE INVENTION

The invention relates to an animal litter and method for making an animal litter.

DESCRIPTION OF THE PRIOR ART

Pet animals are extremely popular in present day homes, resulting in a need for dealing with animal waste. Such waste must be dealt with in an hygenic manner, and preferably in a manner which will also prevent the spread of odors throughout the household. Present day environmental concerns suggest that such animal waste must be capable of being disposed in an environmentally responsible manner, with a reduced impact upon the environment, and in particular landfill and garbage disposal sites, where the animal waste typically, ultimately are located.

Many attempts have been made in the past to provide improved absorbent compositions which are acceptable for use in animal litters, particularly for domestic pets such as cats. Generally litter compositions available today contain large amounts of clay and/or natural grass compositions. Such compositions containing clays have not been entirely satisfactory and have been deficient in one or more of the characteristics and properties necessary as an effective absorbent, particularly for animal litter applications, where odor suppression or elimination is desirable. Such desired characteristics of animal litter include: high absorptive ability; reduced odor, after the litter has been contacted by animal waste products; lack of toxicity; economy; and compatibility with the environment, both while in the home and after disposal in a landfill site. While prior art animal litters are satisfactory as to absorptive ability, lack of toxicity, and economy, such animal litter products are generally deficient with respect to the foregoing odor and environment compatibility characteristics.

Accordingly, prior to the development of the present invention, there has been no animal litter and method for making an animal litter, which: provides a litter which has high absorptive ability; reduces odor; is not toxic; is economical to manufacture and use; and is environmentally sound and compatible with the environment. Therefore, the art has sought an animal litter and method for making an animal litter which animal litter: has high absorptive ability; reduces odor from the animal waste products; has no toxicity; is economical to manufacture and use; and is environmentally sound and compatible with the environment.

SUMMARY OF THE INVENTION

In accordance with the invention, the foregoing advantages have been achieved through the present animal litter and method for making an animal litter. The present invention for an animal litter for absorbing animal waste includes: an absorptive material; and bacteria, whereby the bacteria decomposes the animal waste. A feature the present invention is that a fragrance may be associated with the absorptive material; and the fragrance may be cedar oil applied upon the absorptive material.

An additional feature of the present invention is that the absorptive material has pores and may be selected from the group consisting of clays, diatomateous earth, Fuller's earths, and betonites, that are low in bulk density and have the ability to absorb liquids into their pores. An additional feature of the present invention is that the absorptive material may be Georgia clay. Another feature of the present invention is that the bacteria may be bacillus bacteria, and may further include enzymes which are products of growth of the bacillus bacteria. An additional feature of the present invention is that the enzymes may include protease, amylase, and pacreatin.

In accordance with another aspect of the invention, the foregoing advantages have been achieved through the present method for making an animal litter for absorbing animal waste. The method of the present invention includes the steps of: forming particles of absorptive materials; and combining the particles of absorptive material with bacteria. The present invention may also include the step of associating a fragrance with the absorptive material, and the fragrance may be associated with the absorptive material by applying a liquid fragrance to the absorptive material. A further feature of the present invention is that cedar oil may be utilized as the fragrance, and it may be applied by spraying the cedar oil upon the absorptive material. A further feature of the present invention is that a plurality of cedar needles may be mixed with the absorptive material.

Another feature of the present invention is that the absorptive material which may be utilized has pores and may be selected from the group consisting of clays, diatomateous earths, Fuller's earths, and betonites, that are low in bulk density and have the ability to absorb liquids into their pores. An additional feature of the present invention is that Georgia clay may be utilized as the absorptive material. A further feature of the present invention is that bacillus bacteria may be utilized as the bacteria, and may include enzymes which are products of growth of the bacteria may be added to the absorptive material. The enzymes may include protease, amylase, and pacreatin.

The animal litter and method for making an animal litter of the present invention, when compared with previously proposed prior art animal litters and methods for making animal litters, have the advantages of: having a high absorptive ability; reducing odors associated with the animal waste; lack of toxicity; being economical to manufacture and use; and being environmentally sound, and compatible with the environment, both within the home and landfill sites.

DETAILED DESCRIPTION OF THE INVENTION

While the invention will be described in connection with the preferred embodiment, it will be understood that it is not intended to limit the invention to that embodiment. On the contrary, it is intended to cover all alternatives, modifications, and equivalents as may be included within the spirit and scope of the invention as defined by the appended claims.

The animal litter of the present invention includes an absorptive material and bacteria, whereby the bacteria decomposes the animal waste, upon the animal waste contacting the bacteria which has been mixed with the absorptive material. The absorptive material preferably has pores that has the ability to absorb liquids, as from the animal waste, into the pores. The absorptive material may be selected from the group consisting of clays, diatomateous earths, Fuller's earths, and betonites, all of which are low in bulk density, and have the requisite ability to absorb liquids into their pores. Such materials usually contain more than one component, but most often have a high percentage of kaolinite, or attapulgite, or montmorillonite, or sepiolite, or diatomite. Generally such a material that has any of the above components as the major component is very likely to have lesser amounts of one or all of the other components. Any of the other known clay minerals, e.g. kaolinite and illite are commonly present in non-clay materials and/or silicious materials that cannot be classified as diatomateous earths may be present.

Another absorptive material which may be utilized in the animal litter in the present invention is Georgia clay. Georgia clay is a naturally-occurring clay material consisting predominantly of the clay mineral kaolinite, a crystalline hydrated aluminum silicate of the formula $Al_2O_3-2SiO_2-2H_2O$. This clay mineral is rarely found pure, but is the main constituent of kaolin whose composition is about 40% alumina, about 55% silica, plus impurities and water. Kaolin is also known as china clay; white bole; argilla; porcelain clay; white clay; and is a white-burning clay which, due to its great purity, has a high fusion point and is the most refractory of all clays.

All of the foregoing absorptive materials are generally mined, dried and/or calcined, crushed, and screened, and formed into particles, or pellets, in a conventional manner, to be a conventional size suitable for use as animal litter, as is known in the art. Alternatively, particles, or pellets, of natural grass compositions, or combinations of the foregoing clay, or claylike materials, in combination with natural grass compositions, may be utilized as the absorptive material for the animal litter of the present invention.

Bacteria is associated with the absorptive material as by mixing it with, or spraying it upon, the absorptive material. The bacteria, upon coming in contact with the animal waste materials, will decompose the animal waste, and break it down into simpler products upon decomposition occurring. The decomposition products may include water, carbon dioxide, methane gas, or simple nutrients such as nitrates, phosphates, or sulfates. Such decomposition products are much more environmentally sound and compatible with the home environment, wherein the animal litter of the present invention is first utilized, as well as within a landfill site where the animal litter and waste products will ultimately be located.

Preferably, the bacteria utilized in combination with the absorptive material is a bacillus bacteria, although any other bacteria having the requisite characteristics of being non-toxic, capable of decomposing animal waste products, and compatible with the environment, both in the home and in a landfill site, may be utilized. The bacteria may further include enzymes which are products of growth of the bacillus bacteria, and such enzymes may include protease, amylase and pacreatin. The bacteria, and related enzymes may be combined with the absorptive material, in either a liquid or solid form. The bacteria may be sprayed upon the absorbent material, in the case of a liquid form of bacteria; or mixed with the absorptive material, in the case of a solid form of bacteria and related enzymes.

One form of bacteria useful in the present invention, is a product sold under the name "BIO-ENZYMES", manufactured by Chlorine & Chemical Supply Company, of Pearland, Texas. Such product contains various strains of bacillus bacteria; wheat bran from which the bacteria was produced; protease, amylase and other enzymes that are products of growth of the bacillus bacteria; the enzyme pacreatin; and other components such as corn sugar (dextrose), monopotassium phosphate, and magnesium sulfate. The bacillus bacteria used in this product are naturally occurring microorganisms that have been classified by the American Type Culture Collection as Class 1 agents made up of agents of no recognized hazard under ordinary conditions of handling. This product is manufactured as a dry powder.

As an example, animal litter in accordance with the present invention, can be made by combining 10 pounds of absorptive material, such as Georgia clay, with 2 tablespoons of bacteria in a solid form, such as the "BIO-ENZYME" product previously described, the bacteria being sprinkled upon and mixed with the absorptive material. If desired, a quantity of cedar needles may be included in the animal litter, approximately 6 tablespoons of cedar needles being used in the foregoing example. Similarly, a fragrance may be associated with the animal litter, and the fragrance may be cedar oil, in liquid form, being applied to the absorptive material, as by spraying it upon the absorptive material. In the example previously described, approximately 2 fluid ounces of cedar oil may be utilized. The cedar needles, in addition to supplying a natural fragrance, is believed to make the animal litter more natural looking to animals, particularly cats, and is believed to attract the animals to the litter. The cedar oil serves as a fragrance which helps control odors emanating from the animal waste, until the animal waste has been decomposed by the bacteria. It should be readily apparent to one of ordinary skill in the art that any other suitable, conventional fragrances can be utilized in lieu of the cedar oil. Additionally, other natural products, other than cedar needles, could be utilized in the animal litter, such as pine needles, crushed pine cones, or aromatic leaves from any suitable bush or tree.

It is to be understood that the invention is not limited to the exact details of construction, operation, exact materials or embodiments described, as obvious modifications and equivalents will be apparent to one skilled in the art; for example, anti-dusting agents may be included with the animal litter. Accordingly, the invention is therefore to be limited only by the scope of the appended claims.

I claim:

1. An animal litter for absorbing animal wastes comprising:
   an absorptive material; and
   non-enteric bacteria, whereby the non-enteric bacteria decomposes the animal waste.

2. The animal litter of claim 1, further including a fragrance associated with the absorptive material.

3. The animal litter of claim 2, wherein the fragrance is cedar oil applied to the absorptive material.

4. The animal litter of claim 1, further including a plurality of cedar needles mixed with the absorptive material.

5. The animal litter of claim 1, wherein the absorptive material has pores and is selected from the group consisting of clays, diatomateous earths, Fuller's earths, and betonites, that are low in bulk density and have the ability to absorb liquids into their pores.

6. The animal litter of claim 1, wherein the absorptive material is Georgia clay.

7. The animal litter of claim 1, wherein the non-enteric bacteria is non-enteric bacteria.

8. The animal litter of claim 7, further including enzymes which are products of growth of the non-enteric bacillus bacteria.

9. The animal litter of claim 8, wherein the enzymes include protease, amylase, and pacreatin.

10. A method for making an animal litter for absorbing animal wastes comprising the steps of:
forming particles of an absorptive material; and
combining the particles of absorptive material with non-enteric bacteria.

11. The method of claim 10, including the step of associating a fragrance with the absorptive material.

12. The method of claim 11, wherein the fragrance is associated with the absorptive material by applying a liquid fragrance to the absorptive material.

13. The method of claim 12, including the step of utilizing cedar oil as the fragrance and applying the fragrance by spraying the cedar oil upon the absorptive material.

14. The method of claim 10, including the step of mixing a plurality of cedar needles with the absorptive material.

15. The method of claim 10, wherein the absorptive material which is utilized has pores and is selected from the group consisting of clays, diatomateous earths, Fuller's earths, and betonites, that are low in bulk density and have the ability to absorb liquids into their pores.

16. The method of claim 10, wherein Georgia clay is utilized as the absorptive material.

17. The method of claim 10, wherein non-enteric bacillus bacteria is utilized as the non-enteric bacteria.

18. The method of claim 17, wherein enzymes, which are products of growth of the non-enteric bacteria, are added to the absorptive material.

19. The method of claim 18, wherein the enzymes include protease, amylase and pacreatin.

* * * * *

UNITED STATES PATENT AND TRADEMARK OFFICE
CERTIFICATE OF CORRECTION

PATENT NO. : 5,154,594
DATED : October 13, 1992
INVENTOR(S) : Meredith L. Gamlen It is certified that error appears in the above-identified patent and that said Letters Patent is hereby corrected as shown below:

Column 5, line 2 after "non-enteric", insert -- bacillus --.

Signed and Sealed this

Twenty-first Day of September, 1993

Attest:

BRUCE LEHMAN

*Attesting Officer*  *Commissioner of Patents and Trademarks*